UNITED STATES PATENT OFFICE.

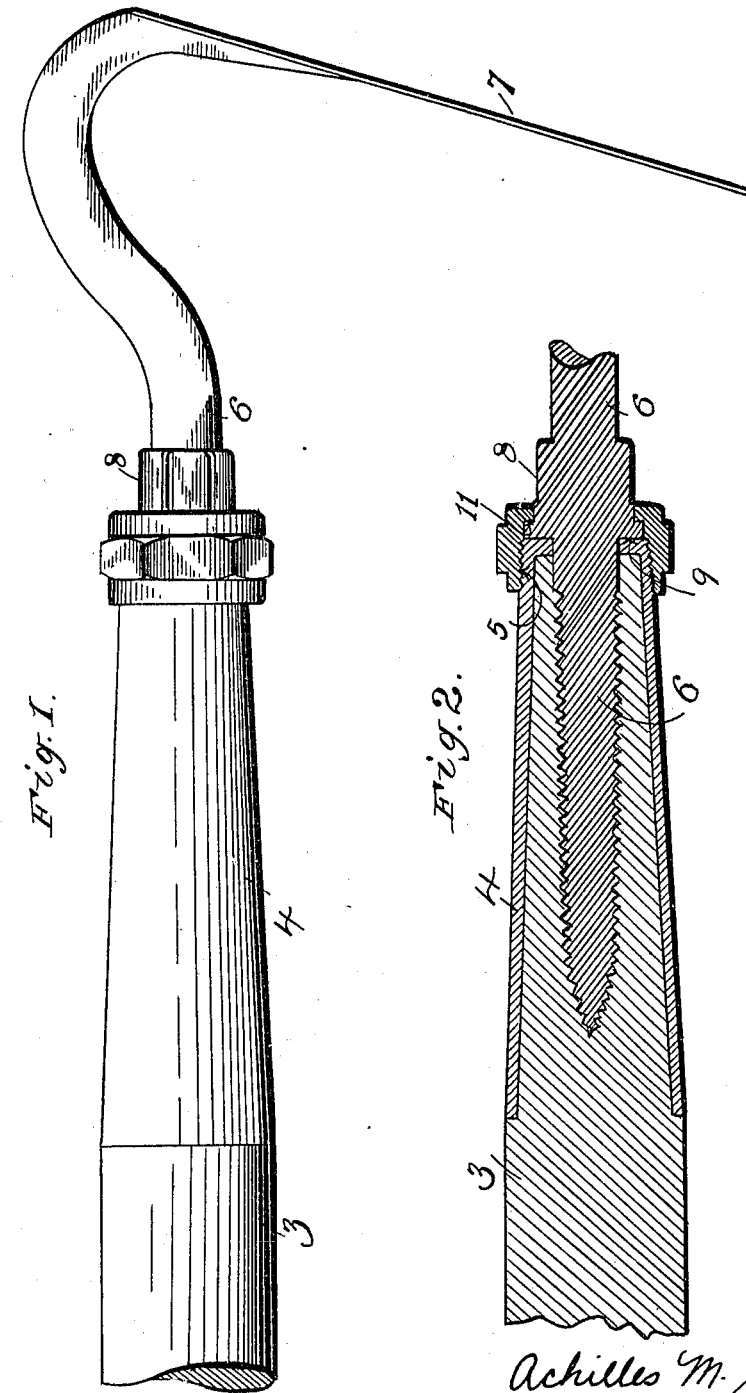

ACHILLES M. SUMMERS, OF BOGUE CHITTO, MISSISSIPPI.

TOOL-HANDLE.

953,108. Specification of Letters Patent. Patented Mar. 29, 1910.

Application filed June 5, 1909. Serial No. 500,278.

*To all whom it may concern:*

Be it known that I, ACHILLES M. SUMMERS, a citizen of the United States of America, and resident of Bogue Chitto, in the county of Lincoln and State of Mississippi, have invented certain new and useful Improvements in Tool-Handles, of which the following is a specification.

This invention relates to tool handles and means for attaching the same to a tool, the said invention relating particularly to implement handles, such as hoes and diggers.

An object of this invention is to provide novel means for attaching the shank of a blade such as a hoe to a handle and anchoring it therein in a manner to prevent the same working loose under ordinary conditions, and furthermore, an object of this invention is to provide novel means coacting with a ferrule and a shoulder on the shank of the blade for clamping the parts in position after the shank has been anchored.

A still further object of this invention is to provide a shank having screw threads thereon designed to enter a ferrule in order that the said shank may be threaded into the end of a handle applied to the said ferrule, means being provided acting with a shoulder on the shank and threads on the ferrule for further retaining the shank in relation to the said handle.

By reason of the invention, a tool handle may be readily detached for the purpose of renewal and a new handle may be substituted into which the threaded shank of the blade may be screwed as heretofore indicated.

Finally an object of this invention is to produce a device of the character noted, which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, in which—

Figure 1, illustrates a view in elevation of a fragment of a hoe handle showing a hoe with a shank applied to a ferrule attached to the handle; and Fig. 2, illustrates a longitudinal sectional view of the shank ferrule and the inner end of the handle.

In these drawings 3, illustrates the handle, 4, a ferrule thereon to which the handle is fitted, the said ferrule having a threaded boss 5, at its outer end. As shown, the outer end of the said ferrule has a hole therein designed to receive a shank 6, which shank is threaded and is designed to be embedded in the end of the handle 3, as fully shown in Fig. 2. The hoe blade 7, has the shank 6, preferably integral therewith and when it is desired to apply the hoe to the handle, rotation of the shank will result in causing the screws of the shank to fit into the end of the handle and the shank of the blade will be anchored thereby. The shank of the blade is further provided with a shoulder 8, angular in cross section for the purpose of engaging a wrench to be utilized in turning the shank when the screw thereof is being forced into the end of the handle and the said shoulder is further provided with an annular flange 9, designed to abut the outer end of the ferrule 4.

For the purpose of retaining the parts against movement and to further insure a tight joint between the shank and the handle, a ring nut is employed having a flange 11, which engages the annular flange on the shoulder. The threads of the ring nut are designed to engage the threaded boss of the ferrule and as the said ring nut is turned, the flange of the nut engages the flange of the shoulder and holds the flange of the shoulder against the end of the ferrule so that undue play or movement of the shank is prevented and wearing of the threads of the shank in the handle is obviated. It will be apparent from an inspection of the drawing that the ring nut may be removed and the threaded shank may be turned to dislodge the shank from the end of the handle for the purpose of renewing the blade or the handle and it will be observed furthermore, that when the parts are in their proper assembled relation, a very strong, durable and efficient connection will be effected between the hoe or other implement and its handle.

I claim—

1. In a tool or implement handle, a ferrule, a handle, said ferrule having a hole in its end and being provided with threads, a tool having a threaded shank passed through the hole and threaded in the end of the handle, a shoulder on the shank and integral therewith having an annular flange, and a ring nut for engaging the threads of the ferrule and the flange for clamping the said flange to the ferrule.

2. In a tool or implement handle, a ferrule, a handle, said ferrule having a hole in its end and being provided with threads, a tool having a threaded shank passed through the hole in the ferrule and threaded in the end of the handle, a shoulder angular in cross section integral with said shank, a flange on the shoulder, and a nut for engaging the threads of the ferrule and the flange of the shoulder for clamping the said flange to the ferrule.

In testimony whereof, I affix my signature in the presence of two witnesses.

ACHILLES M. SUMMERS.

Witnesses:
E. F. BRENNAN, Jr.,
R. W. McNAIR.